July 12, 1949.  C. M. LONG  2,475,904
BUILDING BLOCK MOLDING MACHINE
Filed Feb. 21, 1946  2 Sheets-Sheet 2
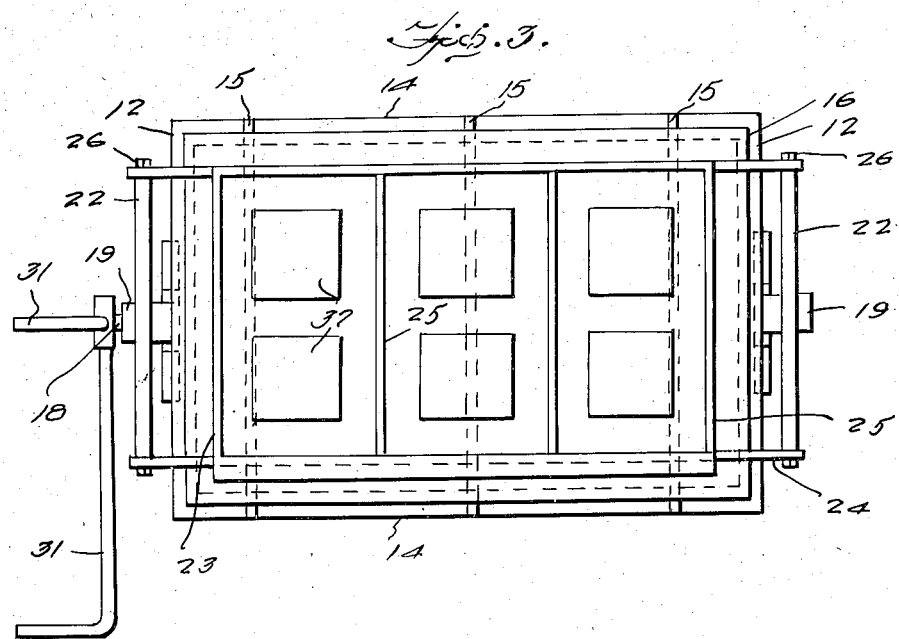
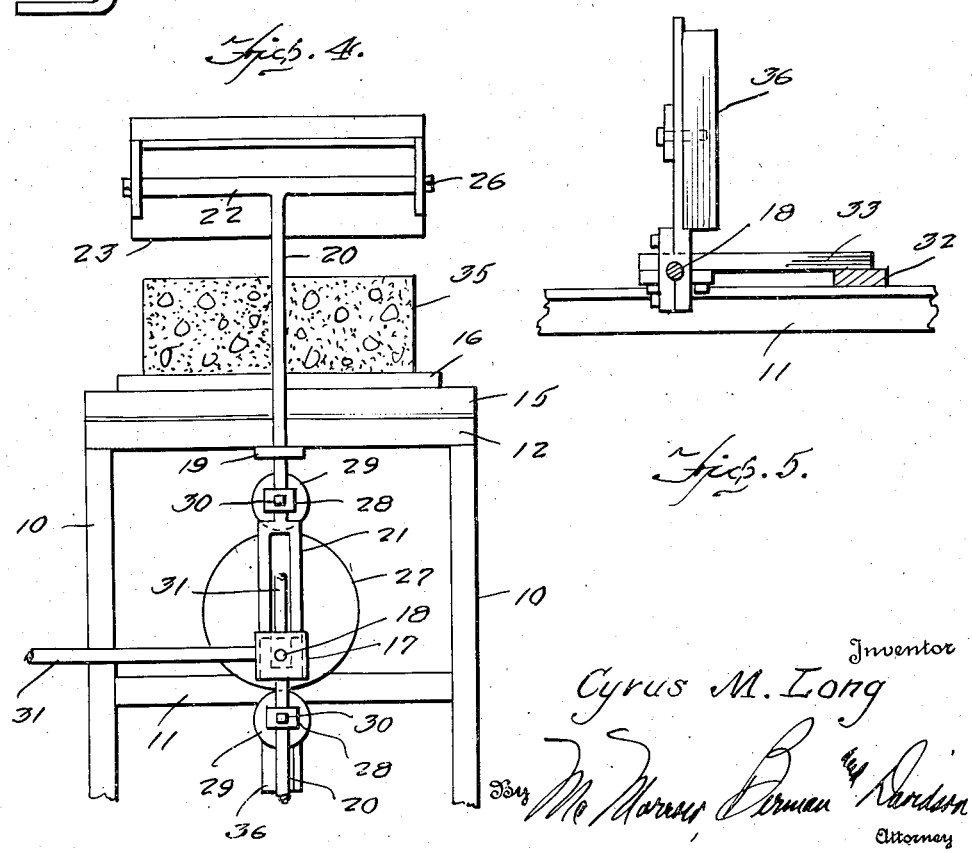
Inventor
Cyrus M. Long Patented July 12, 1949

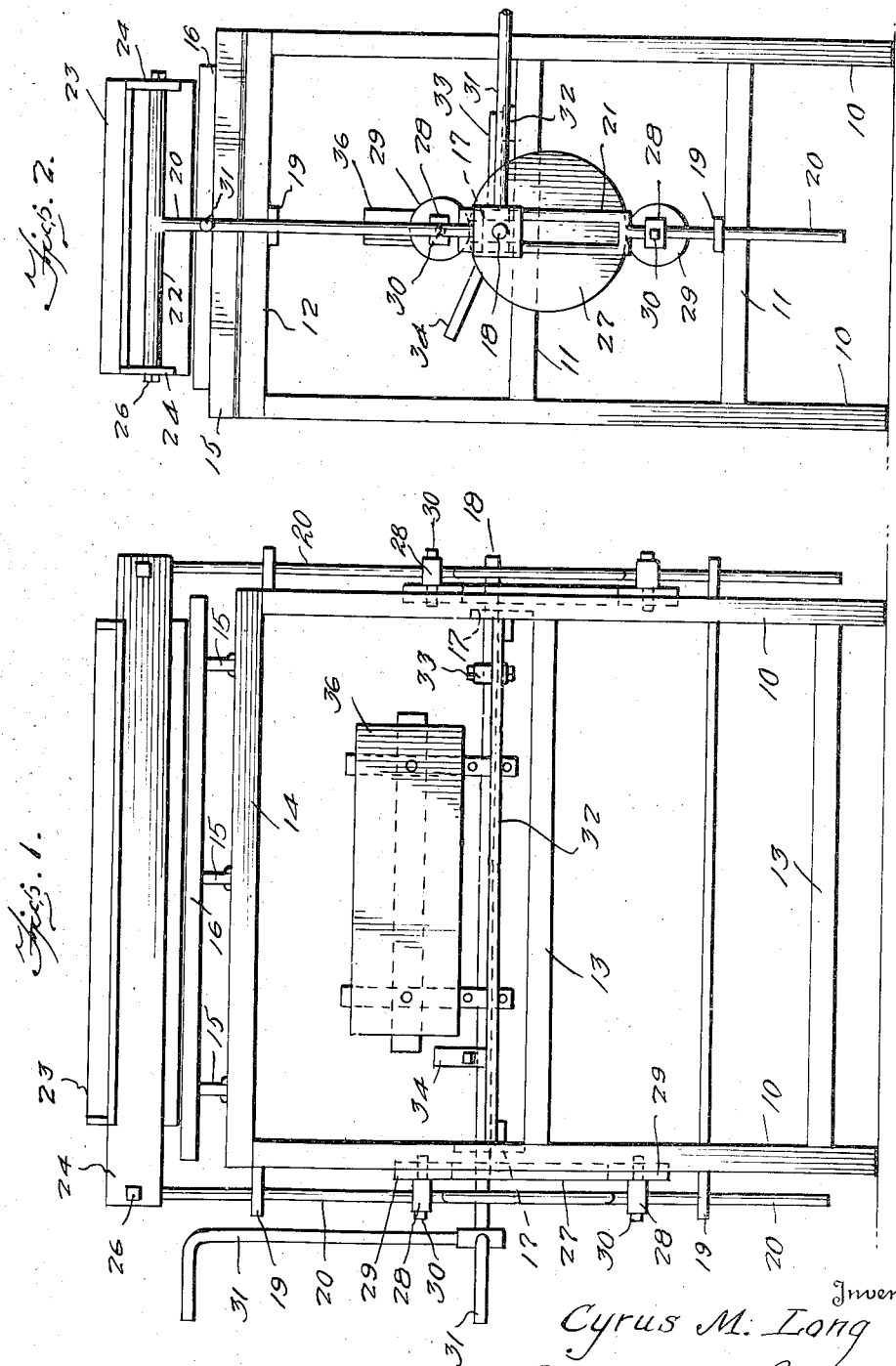

2,475,904

UNITED STATES PATENT OFFICE 2,475,904

BUILDING BLOCK MOLDING MACHINE

Cyrus M. Long, Auburn, Wash.

Application February 21, 1946, Serial No. 649,172

4 Claims. (Cl. 25—41)

My invention relates to molding machines and more particularly to machines for molding hollow building blocks.

The object of my invention is to produce a molding machine adapted to vibrate plastic concrete into a dense mass on a wooden pallet without leakage of water or cement between the pallet and the mold.

Another object of my invention is to provide a molding machine making it possible to remove the blocks on the pallet about 30 seconds after the machine has been started to mold them.

Other objects of my invention may appear in the following specification describing my invention with reference to the accompanying drawings illustrating a preferred embodiment of my invention. It is, however, to be understood that my invention is not to be limited or restricted to the exact construction and combination of parts described in the specification and shown in the drawings but that such changes and modifications can be made, which fall within the scope of the claims appended hereto.

In the drawings:

Figure 1 is a front elevation of the molding machine according to my invention.

Figure 2 is an end view of Figure 1.

Figure 3 is a top plan view of Figure 1.

Figure 4 is a fragmentary end view of the molding machine according to my invention, the mold being shown in position lifted from the pallet supporting molded blocks, and Figure 5 is a detail view of a counter-weight arrangement for balancing the weight of the empty mold while being lifted from the pallet.

Referring now in detail to the drawings, the molding machine according to my invention has a frame preferably made of angle iron. It has four legs 10 stiffened by cross pieces 11 and top cross pieces 12 and longitudinal bracing pieces 13 and top longitudinal pieces 14.

Three bars 15 extend transversely of the top frame formed by the top cross pieces 12 and top longitudinal pieces 14, and these bars are welded onto the longitudinal pieces 14 in equal distances from each other. After being welded into position the top surfaces of the three bars 15 are ground so that they form a true level surface. A wooden pallet 16 is planed on top and bottom and rests on the ground top surfaces of the bars 15.

On each of the center cross pieces 11 midway between the legs 10 a bearing 17 is arranged and a rock shaft 18 is rotatably supported in these bearings.

On each of the top cross pieces 12 and the bottom cross pieces 11 a guide 19 is arranged in which a supporting rod 20 is slidably positioned. Intermediate the ends of each supporting rod an open rectangular portion 21 is formed, permitting the shaft 18 to extend therethrough so that the supporting rods can be moved freely up and down.

Each supporting rod 20 has a crosswise extending tubular member 22 on its upper end. A mold 23 has two longitudinal side members 24 and a plurality of cross members 25 forming individual molds of any desired size. The over-all dimension of the mold 23 is always the same and the side members 24 extend beyond the end cross members 25. The tubular members 22 are located between the ends of the side members and a bolt 26 extends through each tubular member and the adjacent ends of the side members exchangeably supporting the mold 23.

Adjacent each end of the shaft 18 an eccentric 27 is rigidly mounted on the shaft inside of the supporting rod 20. On each supporting rod two sleeves 28 are adjustably arranged and each sleeve rotatably supports a follower roller 29 permanently in contact with an eccentric 27. Set screws 20 secure the sleeves and follower rollers in adjusted position relative to the eccentrics 27.

On one end of the eccentric shaft 18 two hand levers 31 are rigidly mounted and extend at right angles to each other. A stop bar 32 extends longitudinally of the frame and is supported by the center cross pieces 11. An arm 33 is adjustably clamped on the eccentric shaft 18 and is adapted to engage the stop bar 32, when the eccentric shaft is rotated by means of the hand levers so that the cams pull the mold 23 downwardly into close contact with the pallet 16.

Another arm 34 is also adjustably clamped on the eccentric shaft 18 and is positioned so that it will engage the stop bar 32 when the eccentric shaft is rotated so that the eccentrics lift the mold 23 from the pallet 16 and the building blocks 35 on the pallet.

To facilitate the lifting of the mold 23 a counter-weight 36 is adjustably and exchangeably clamped onto the eccentric shaft 18.

Core boxes 37 are suspended in the individual molds in any desired conventional manner. The top and bottom faces of the members forming the mold are surface ground, and the pallet is brushed with oil before use. This results in a close junction between the mold and the pallet, preventing leakage of water or cement between the two parts.

The vibrating mechanism commonly used with block molding machines does not form a part of my invention and is therefore not described nor shown. Any desired vibrating mechanism may be used, for instance, a magnetic vibrator clamped to a leg of the machine.

To operate the machine a quarter revolution is imparted to the eccentric shaft 18 by pushing or pulling one handle lever 31. When this is done the other hand lever is in position for operation and the movement of the mold can be finished with this second hand lever.

Having described my invention, what I claim and desire to secure by Letters Patent is:

1. A molding machine for building blocks including a frame, a ground top surface on said frame, a pallet planed on both sides resting on the ground frame top surface, a shaft extending lengthwise of and rotatably supported by the frame, a hand lever on the shaft to rotate it, a supporting rod vertically slidably arranged on each end of the frame, a tubular cross piece on the top of each supporting rod, a mold having a ground bottom surface and adapted to fit tightly on the pallet, a bolt extending through each tubular member and removably engaging the ends of the side members of the mold, and cooperating means on the shaft and the supporting rods for moving the mold in and out of pallet engaging position.

2. A molding machine for building blocks including a frame slidably supporting a supporting rod on each of its ends in vertical position, an open rectangular portion arranged intermediate the ends of each supporting rod, a ground top surface on the frame, a planed pallet mounted on the top surface, a surface ground mold supported by the supporting rods and adapted to tightly engage the pallet, a shaft rotatably supported by the frame and extending through the open rectangular portions of the supporting rods, eccentric rigidly mounted on each end of the shaft adjacent each supporting rod, two followers rotatably and adjustably attached to each supporting rod above and below each eccentric and adapted to be contacted thereby, and means for rotating the shaft in either direction and thereby moving the mold in and out of pallet engaging position.

3. In a machine for molding building blocks, a frame having a horizontal top, a flat pallet mounted on said frame, a mold reciprocably mounted above said pallet, a pair of supporting rods reciprocably mounted adjacent the opposite ends of said frame and supporting said mold, said rods having integral open frame sections therein, a pair of followers pivotally mounted on each supporting rod above and below the open frame sections, a rock shaft journaled longitudinally of the frame, and eccentrics mounted on the rock shaft intermediate the pair of followers on the supporting rods for raising and lowering the mold.

4. In a machine for molding building blocks, a frame having a horizontal top, a flat pallet mounted on said frame, a mold reciprocably mounted above said pallet, a pair of supporting rods reciprocably mounted adjacent the opposite ends of said frame and supporting said mold, said rods having integral open frame sections therein, a pair of sleeves mounted on each supporting rod above and below said open frame sections, followers rotatably mounted on said sleeves, a rock shaft journaled longitudinally of the frame, and eccentrics mounted on said rock shaft intermediate the pairs of followers on each supporting rod for raising and lowering the mold.

CYRUS M. LONG.

REFERENCES CITED

The following references are of record in the file of this patent:

UNITED STATES PATENTS

| Number | Name | Date |
| --- | --- | --- |
| 777,086 | Emery | Dec. 13, 1904 |
| 830,157 | Lowe | Sept. 4, 1906 |
| 1,634,740 | Dale | July 5, 1927 |
| 1,957,421 | Daniels et al. | May 1, 1934 |

FOREIGN PATENTS

| Number | Country | Date |
| --- | --- | --- |
| 547,522 | France | Dec. 18, 1922 |